United States Patent [19]

Nishimura et al.

[11] Patent Number: 5,038,032

[45] Date of Patent: Aug. 6, 1991

[54] ENCODER INCORPORATING A DISPLACEABLE DIFFRACTION GRATING

[75] Inventors: Tetsuharu Nishimura; Yoichi Kubota, both of Kawasaki; Satoshi Ishii, Tokyo; Koh Ishizuka, Urawa; Masaaki Tsukiji, Tokyo, all of Japan

[73] Assignee: Canon Kabushiki Kaisha, Tokyo, Japan

[21] Appl. No.: 488,733

[22] Filed: Feb. 26, 1990

[51] Int. Cl.$^5$ .............................................. G01D 5/34
[52] U.S. Cl. ........................... 250/231.16; 250/237 G; 356/356
[58] Field of Search ........................ 250/231.13, 231.14, 250/231.16, 231.17, 237 G; 33/707; 341/13; 356/356, 363; 324/175

[56] References Cited

U.S. PATENT DOCUMENTS

| | | |
|---|---|---|
| 4,629,886 | 12/1986 | Akiyama et al. ............... 250/237 G |
| 4,676,645 | 6/1987 | Taniguchi et al. ................. 356/363 |
| 4,829,342 | 5/1989 | Nishimura ...................... 250/231.16 |
| 4,868,385 | 9/1989 | Nishimura . |
| 4,912,320 | 3/1990 | Ishii et al. . |
| 4,930,895 | 6/1990 | Nishimura et al. . |
| 4,933,673 | 6/1990 | Ishizuka et al. . |

FOREIGN PATENT DOCUMENTS

| | | |
|---|---|---|
| 58-191907 | 11/1983 | Japan . |
| 62-163924 | 7/1987 | Japan . |
| 62-163926 | 7/1987 | Japan . |
| 62-200225 | 9/1987 | Japan . |

Primary Examiner—David C. Nelms
Attorney, Agent, or Firm—Fitzpatrick, Cella, Harper & Scinto

[57] ABSTRACT

An encoder in which a light beam emitted from a semiconductor laser or the like is applied to a diffraction grating from a predetermined direction which is not contained in a reference plane defined by direction of relative movement of the diffraction grating and a direction normal to the diffraction grating. A diffracted light created from the diffraction grating by the application of the light beam by the light applying means is reflected by re-entering means and the reflected light is caused to re-enter the diffraction grating at substantially the same position as the position at which the diffracted light is created. At this time, an interference light formed by the other re-diffracted lights than 0-order light created from the diffraction grating substantially in the same direction as the predetermined direction by the re-entrance of the diffracted light by the re-entering means is detected, and the information of the relative displacement of the light beam and the diffraction grating is obtained from a variation in the intensity of the interference light.

26 Claims, 4 Drawing Sheets

ENCODER INCORPORATING A DISPLACEABLE DIFFRACTION GRATING

BACKGROUND OF THE INVENTION

1. Field of the Invention

This invention relates to an encoder such as a linear encoder or a rotary encoder for causing a light beam to enter a displaceable diffraction grating a plurality of times, and optically detecting any variation in a intensity of an interference light formed thereby, thereby detecting the displaced state such as the amount of displacement or the direction of displacement of the diffraction grating.

2. Description of the Related Background Art

In recent years, in precision machines such as NC machine tools and semiconductor printing apparatuses, there has been required a precise measuring machine which can measure the driving state and movement in units of 1 μm or less (submicron). As a measuring machine which can accomplish measurement in submicron units, there is well known an encoder such as a rotary encoder or a linear encoder for causing a coherent light beam such as a laser beam to enter a diffraction grating formed on a moving object, causing diffracted lights of predetermined orders created from the diffraction grating to interfere with each other, counting the light and dark of the interference fringes and thereby finding a displaced state such as the amount of displacement or the direction of displacement of the moving object. For example, such rotary encoder is generally used in such a system that the number of revolutions of a motor is judged from the output of the encoder mounted on the rotary shaft of the motor and the driving of the motor is controlled on the basis thereof.

The applicant proposed such encoders, for example, in Japanese Laid-Open Patent Application No. 58-191907, Japanese Laid-Open Patent Application No. 62-163926, Japanese Laid-Open Patent Application No. 62-163924 and Japanese Laid-Open Patent Application No 62-200225.

Generally, in an encoder for forming interference fringes by the utilization of diffracted lights of predetermined orders created from a diffraction grating connected to a moving object, counting the light and dark stripes of the interference fringes by detecting means, i.e., detecting any phase variation in the interference fringes, and thereby detecting the displaced state of the moving object, it is sometimes the case that regular reflected light (0-order reflected diffracted light), when a coherent light beam is caused to enter the diffraction grating, enters the detecting means through various elements of the device.

The regular reflected light at this time does not cause any phase variation even if the diffraction grating is displaced, and is an unnecessary light that is unnecessary for the detecting means. If this unnecessary light enters the detecting means, there will arise a problem that it will become a flare light (a ghost light) and will reduce the S/N ratio of the output signal of the detecting means and thus, will reduce measurement accuracy.

In contrast, there is a method of preventing the incidence of the regular reflected light onto the detecting means by the use of a polarizing beam splitter and a wavelength plate, i.e., by the use of the construction of a so-called light isolator, but even if this method is used, it has been very difficult to completely prevent the regular reflected light from entering the detecting means.

SUMMARY OF THE INVENTION

The present invention has as its object the provision of an encoder in which by appropriately setting the direction of incidence of a coherent light beam onto a diffraction grating provided on a moving object, regular reflected light from the diffraction grating is effectively prevented from becoming a flare light and entering detecting means, thereby preventing a reduction in the S/N ratio of the output signal of the detecting means and enabling highly accurate measurement to be accomplished.

DESCRIPTION OF THE PREFERRED EMBODIMENTS

Figure 1A:
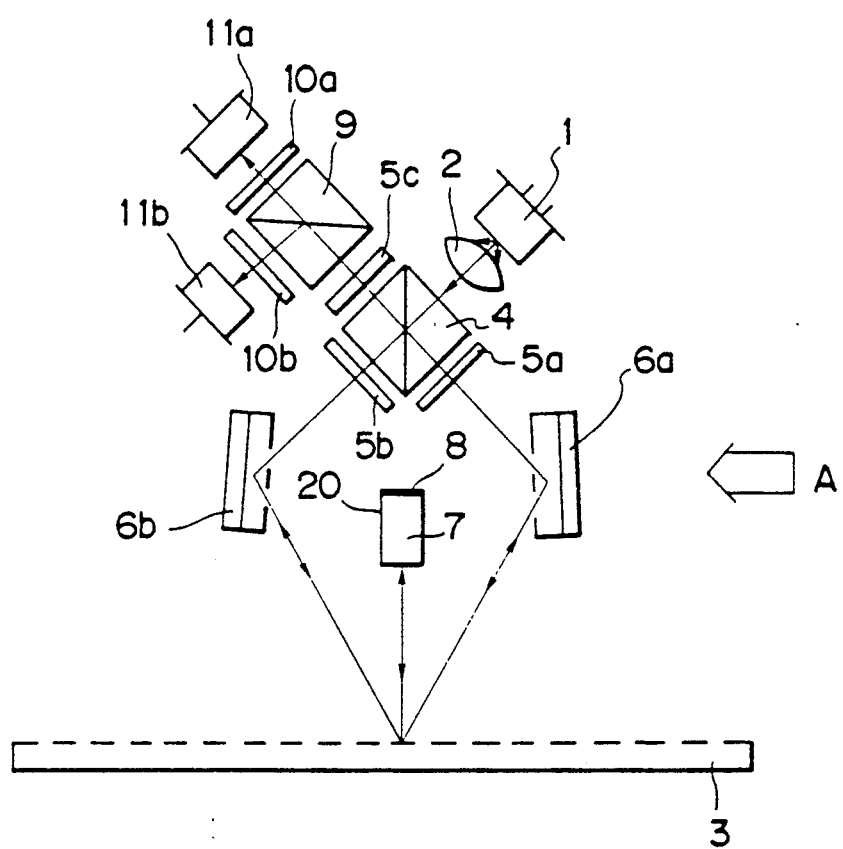
FIGS. 1A and 1B schematically show the essential portions of a first embodiment of the present invention.

FIG. 1A is a schematic view of the optical system of a first embodiment of the encoder of the present invention.

In FIG. 1A, the reference numeral 1 designates a laser which produces a coherent light beam and which may preferably be, for example, a semiconductor laser. The reference numeral 2 denotes a collimator lens, and the reference numeral 3 designates a diffraction grating of grating pitch d mounted on a moving object, not shown, and moving at a velocity V, for example, in the direction of arrow A. Here, the moving object is a movable object connected to the driving output portion of a drive source such as a motor, or an object such as a moving stage, and effects rotational movement in the case of a rotary encoder, and effects rectilinear movement in the case of a linear encoder. In terms of the system, a construction having a control circuit for feeding back the output of the encoder and controlling the driving of the aforementioned drive source is popular.

The reference numeral 4 designates a polarizing beam splitter, the reference characters 5a, 5b and 5c denote quarter wavelength plates, and the reference characters 6a and 6b designate reflecting mirrors which are set at an angle in predetermined directions as will be described later.

The reference numeral 7 denotes an index gradient type optical member of the end surface imaging type having reflecting film 8 applied to one end thereof. The optical member 7 and the reflecting film 8 together constitute a condensing system 20. This condensing system 20 forms a so-called cat's-eye optical system in which the direction of incidence and the direction of reflection are substantially identical to each other. A corner cube may be used as the optical system 20.

The reference numeral 9 designates a beam splitter, and the reference characters 10a and 10b denote polarizing plates whose polarization axes are orthogonal to each other and are further disposed so as to form an angle of 45° with respect to the polarization axes of the quarter wavelength plates 5a and 5b. The reference characters 11a and 11b designate light receiving elements.

Before a description is provided of the arrangement of the two reflecting mirrors 6a and 6b which characterize the present invention, the measurement principle of the encoder of the present invention will now be described.

In the present embodiment, the coherent light beam from the laser 1 is substantially collimated by the collimator lens 2, is caused to enter the polarizing beam splitter 4 and is divided into two light beams, i.e., a rectilinearly polarized transmitted light beam and a rectilinearly polarized reflected light beam. The mounted position of the laser 1 is adjusted so that at this time, the azimuth of the rectilinear polarization of the emitted light beam from the laser 1 may be 45° with respect to the polarizing beam splitter 4. Thus, the intensity ratio between the transmitted light beam and the reflected light beam from the polarizing beam splitter 4 may become approximately 1:1.

The reflected light beam and the transmitted light beam from the polarizing beam splitter 4 are made into circularly polarized lights through the quarter wavelength plates 5a and 5b, and when they are reflected by the reflecting mirrors 6a and 6b so as to enter the diffraction grating 3, they are caused to enter the diffraction grating so that the mth-order diffracted light from the diffraction grating 3 which is the object may emerge from the diffraction grating 3 at a predetermined angle ε.

The mth-order diffracted light which has emerged from the diffraction grating 3 at the predetermined angle is caused to enter the optical member 7. The reflecting film 8 is applied to the vicinity of the focal plane of the optical member 7 and therefore, the light beam which has entered the optical member 7 is reflected by the reflecting film 8, whereafter it returns along the original optical path and emerges from the optical member 7, and again enters the same emergence position on the diffraction grating 3.

The mth-order re-diffracted light again diffracted by the diffraction grating 3 returns along the original optical path, is reflected by the reflecting mirrors 6a and 6b, passes through the quarter wavelength plates 5a and 5b and re-enters the polarizing beam splitter 4.

By this time, the diffracted light has reciprocated through the quarter wavelength plates 5a and 5b and therefore, the light beam reflected at first by the polarizing beam splitter 4 differs by 90° in polarization azimuth relative to the polarizing beam splitter 4 when it re-enters the polarizing beam splitter 4 and thus, it is transmitted through the polarizing beam splitter 4. Conversely, the light beam transmitted at first through the polarizing beam splitter 4 is reflected when it re-enters the polarizing beam splitter 4.

Thus, the two diffracted lights are made to overlap with each other by the polarizing beam splitter and the overlapping light is passed through the quarter wavelength plate 5c, whereafter it is made into a circularly polarized light and is divided into two light beams by the beam splitter 9, and the two light beams are passed through the polarizing plates 10a and 10b, respectively, whereafter they are made into rectilinearly polarized lights and are caused to enter the light receiving elements 11a and 11b.

In the present embodiment, the phase of the mth-order diffracted light is varied by $2m\pi$ when the diffraction grating is moved by one pitch. Accordingly, the light receiving elements 11a and 11b receive the interference light of the light beam subjected twice to the positive and negative mth-order diffractions and therefore, when the diffraction grating is displaced by an amount corresponding to one pitch of the grating, there are obtained 4 m sine wave signals.

Assuming that for example, the pitch of the diffraction grating is 1.6 μm and the 1st-order (m = 1) is utilized as diffracted light, when the diffraction grating 3 is displaced by 1.6 μm, there are obtained four sine wave signals from the light receiving elements 11a and 11b. That is, ¼ of the pitch of the diffraction grating 3, i.e., 1.6/4 = 0.4 μm, is obtained as the resolving power per one sine wave.

Also, the design is made such that a phase difference of 90° is provided between the output signals from the light receiving elements 11a and 11b by a combination of the quarter wavelength plates 5a, 5b, 5c and the polarizing plates 10a, 10b so that the direction of displacement of the diffraction grating 3 can also be discriminated. If only the amount of displacement is to be measured, one light receiving element may suffice and the quarter wavelength plate 5c and the beam splitter 9 will be unnecessary.

The arrangement of the two reflecting mirrors 6a and 6b in the present embodiment will now be described.

In the present embodiment, the two reflecting mirrors 6a and 6b are inclined so that the plane of incidence of a coherent light beam onto the diffraction grating 3 (a plane containing the direction of arrangement of the gratings of the diffraction grating and the incident light beam) and a reference plane formed by the direction of arrangement of the gratings of the diffraction grating and a direction normal to the surface of the diffraction grating may form a predetermined angle e therebetween.

Figure 1B:
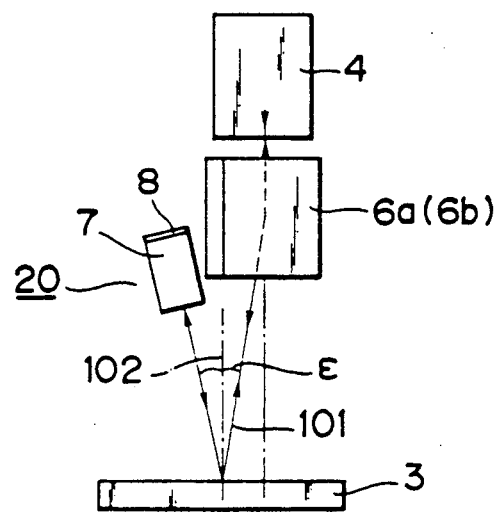

FIG. 1B is an illustration when FIG. 1A is seen in the direction of arrow A.

As shown in FIG. 1B, the reflecting mirrors 6a and 6b are inclined so that the plane of incidence 101 formed by two incident light beams reflected by the two reflecting mirrors 6a and 6b and entering the diffraction grating 3 may form an angle ε with respect to the reference plane 102 formed by the direction of arrangement of the gratings of the diffraction grating 3 and the direction normal to the surface of the diffraction grating. The optical member 7 is disposed at a symmetrical position inclined by an angle ε on the side opposite to the plane of incidence 101 with respect to the reference plane 102.

The difference between the prior art and the present embodiment will now be considered.

Figure 4:
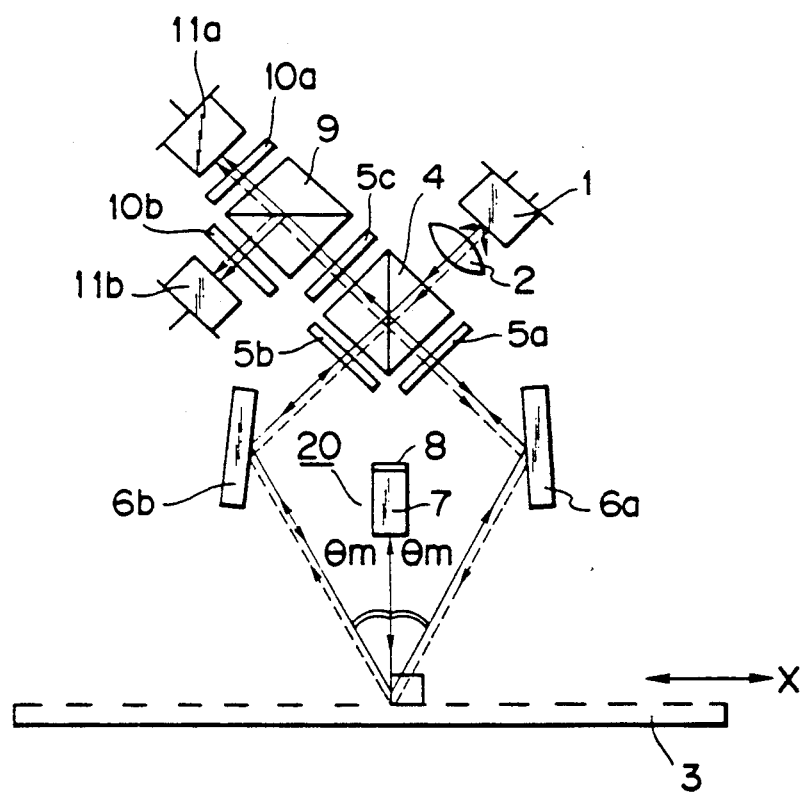
FIG. 4 is a schematic view of the essential portions for the comparison with FIG. 1A.

If in the device of the present embodiment, the plane of incidence 101 and the reference plane 102 are set so as to be positioned on the same plane without being inclined by the angle ε as in the prior art, there will arise a problem that a light beam as indicated by broken line in FIG. 4, i.e., a regular reflected light (0-order reflected diffracted light) on the surface of the diffraction grating 3, passes through each element and enters the light receiving elements 11a and 11b and becomes a flare light of great intensity and reduces the S/N ratio of the output signals of the light receiving elements 11a and 11b.

If here, for example, an amplitude type grating whose reflecting portion and non-reflecting portion are 1:1 is utilized as the diffraction grating 3, the diffraction efficiency of the 0-order diffracted light is about 25% and the diffraction efficiency of the 1st-order diffracted light is about 10%. Accordingly, of the light beam emitted from the laser 1, the quantity of light of the ±1st-order diffracted lights reciprocally diffracted by the diffraction grating 3 and returning to the polarizing beam splitter 4 is 100%×10%×10%=1%, and in contrast, the quantity of light of the O-order reflected diffracted light which is a regular reflected light beam is 100%×25%=25%. Accordingly, even if a light isolator is constructed by a combination of the polarizing beam splitter 4 and the wavelength plates 5a and 5b, unless the extinction ratio is at least 1/25 or less, the regular reflected light beam which is a flare light becomes greater than the ±1st-order diffracted light beams, thus reducing the S/N ratio of the output signals of the light receiving elements 11a and 11b. To facilitate the output signal processing by an electric circuit at the subsequent stage, it is preferable that the extinction ratio be of the order of 1/100 or less. However, it is very difficult to achieve this by a combination of an ordinary polarizing beam splitter and quarter wavelength plates.

In contrast, in the present embodiment, as previously described, the two reflecting mirrors 6a and 6b are inclined, whereby when the regular reflected light reflected by the surface of the diffraction grating 3 is reflected by the reflecting optical system 20 and returns along the original optical path, it does not overlap with the optical path of the ±mth-order re-diffracted lights so that it may not enter the light receiving elements 11a and 11b.

Figure 2:
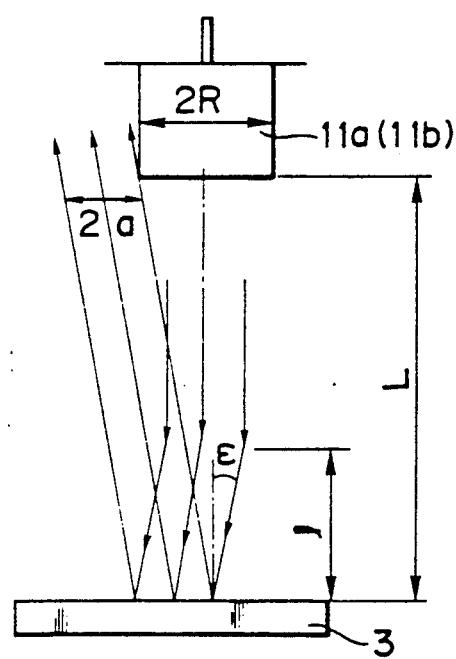
FIG. 2 illustrates the optical path of FIGS. 1A and 1B.

FIG. 2 is an illustration showing the distance between the diffraction grating 3 and the light receiving element 11 when the elements of FIG. 1 are developed. When as shown in FIG. 2, the length of the optical path between the diffraction grating 3 to the light receiving element 11 via the reflecting mirror 6, the polarizing beam splitter 4 and the beam splitter 9 is L and the length of the optical path between the reflecting mirror 6 to the diffraction grating 3 is l and the light receiving diameter of the light receiving element 11 is 2R and the diameter of the light beam is 2a, the inclination ε of the incident light beam onto the diffraction grating 3 is an angle of $\tan^{-1}[(R+a)/(L+l)]$ or greater.

By this means the incidence of a flare light onto the light receiving elements is effectively prevented.

When for example, L=65 mm and l=20 mm and 2R=3 mm and 2a=3 mm, $\epsilon = \tan^{-1}(3/90) = 2$ degrees or greater Another embodiment of the encoder of the present invention will now be described.

Figure 3A:
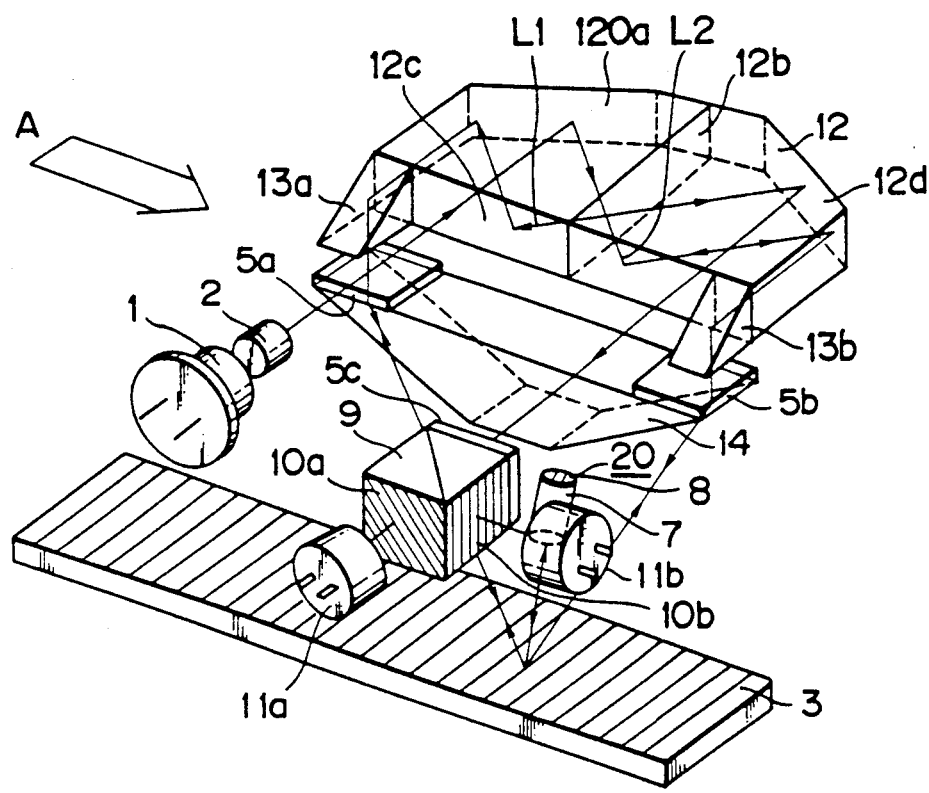
FIGS. 3A and 3B schematically show the essential portions of a second embodiment of the present invention.
Figure 3B:
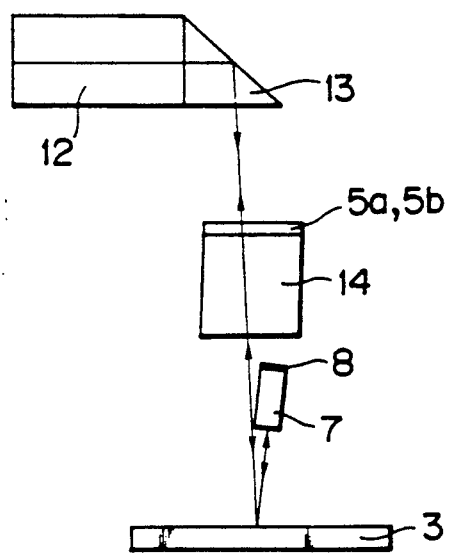

FIG. 3A is a schematic view of the essential portions of a second embodiment of the present invention, and FIG. 3B is a schematic view taken in the direction of arrow A in FIG. 3A.

In this embodiment, elements identical to those in FIGS. 1A and 1B are given identical reference numerals.

In the present embodiment, the reference numeral designates a polarizing prism, and the reference characters 13a and 13b denote reflecting prisms secured to a portion of the polarizing prism 12. The reference numeral 14 designates a turn-back prism.

The reflecting prisms 13a, 13b and the turnback prism 14 have a function similar to that of the two reflecting mirrors 6a and 6b in the first embodiment of FIG. 1.

In the present embodiment, the light beam from the laser 1 is substantially collimated by the collimator lens 2 and is caused to enter the polarizing prism 12. The light beam which has entered the polarizing prism 12 is reflected by a reflecting surface 12a, whereafter it is divided into two light beams, i.e., a reflected light beam L1 and a transmitted light beam L2, by a polarized beam dividing surface 12b.

The light beams L1 and L2 are reflected by a reflecting surface 12c and reflecting surfaces 12a, 12d, respectively, are reflected by the reflecting prisms 13a and 13b, respectively, and then emerge therefrom, and are transmitted through the quarter wavelength plates 5a and 5b, respectively, whereafter they are refracted by a predetermined angle by the turn-back prism 14 and are caused to enter the diffraction grating 3 at predetermined angles. Then, a diffracted light of a predetermined order diffracted by the diffraction grating 3 is caused to enter the diffraction grating 3 again through the condensing system 20, and two re-diffracted lights from the diffraction grating 3 are caused to overlap with each other through the turn-back prism 14, the reflecting prisms 13a, 13b and the polarizing prism 12, whereafter as in the first embodiment, the overlapping light is transmitted through the quarter wavelength plate 5c, and is divided into two light beams by the beam splitter 9, and the two light beams are passed through the polarizing plates 10a and 10b, whereafter they are received by the light receiving elements 11a and 11b, respectively.

In the present embodiment, the reflecting prisms 13a and 13b are slightly inclined to vary the angles of the reflecting surfaces thereof slightly from 45°, thereby causing the light beams to obliquely enter the diffraction grating 3, as shown in FIG. 3B, and obtaining an effect similar to that of the first embodiment of FIG. 1.

In the present invention, the method of inclining the coherent light beam by a predetermined angle and causing it to enter the diffraction grating and the method of forming interference fringes are not limited to the forms of the above-described embodiments, but a variety of methods may be used.

As described above, according to the present invention, there can be realized an encoder in which as previously described, elements are set so that the plane of incidence of the light beam onto the diffraction grating and the reference plane formed by the direction of arrangement of the gratings of the diffraction grating and the direction normal to the surface of the diffraction grating may be inclined by a predetermined angle, whereby the regular reflected light from the diffraction grating can be effectively prevented from entering the light receiving elements and output signals of a high S/N ratio from the light receiving elements can be obtained to thereby enable highly accurate measurement to be accomplished.

We claim:

1. An encoder having:
    light applying means for applying a light beam from a light source to a diffracting grating from a predetermined direction which is not contained in a reference plane defined by the direction of relative movement of the diffracting grating and by a direction normal to the diffracting grating;
    re-entering means having reflecting means, said reflecting means being located so as to reflect a diffracted light of predetermined order except for the 0-th order generated by the application of the light beam by said light applying means to the diffracting grating, and for causing the reflected light to re-enter the diffracting grating at substantially the same position as the position at which the diffracted light is generated;

interfering means for combining and interfering diffracted, reflected, and re-diffracted light diffracted by the diffracting grating, reflected by said reflecting means to re-enter the diffracting grating and re-diffracted by the diffracting grating with another light beam from the light source; and detecting means for detecting light and having a light detector located at a position capable of receiving the interfered light created by said interfering means and not receiving the 0-th order light, whereby information of the relative movement of the light beam and the diffracting grating can be obtained on the basis of an output of said detecting means.

2. An encoder according to claim 1, wherein said re-entering means is disposed so that the direction of said reflected light may be substantially symmetrical with said predetermined direction with respect to said reference plane, and causes the reflected light to re-enter substantially the same position as the position at which said diffracted light is generated.

3. An encoder according to claim 2, wherein said re-entering means forms a cat's-eye optical system in which the direction of incidence onto said re-entering means and the direction of reflection from said re-entering means are substantially identical to each other.

4. An encoder according to claim 1, wherein said light applying means includes the light source for producing the light beam.

5. An encoder according to claim 4, wherein said light source is a semiconductor laser.

6. An encoder according to claim 1, wherein said detecting means includes a plurality of photodetector elements, and said encoder detects the information of the direction of movement of said diffraction grating as well as the information of the amount of displacement of said diffraction grating.

7. An encoder according to claim 1, wherein said encoder is a rotary encoder and wherein the diffraction grating is formed along the direction of rotation of a rotational object, and said detecting means obtains the information of the amount of rotation of the diffraction grating.

8. An encoder according to claim 1, further having a light divider for dividing the light beam into a plurality of light beams and wherein the plurality of light beams obtained by said light divider are applied onto the diffraction grating, and an interference light formed by a plurality of diffracted lights of different orders emerging from the diffraction grating is detected by said detecting means.

9. An encoder according to claim 8, wherein said plurality of diffracted lights of different orders are ±1st-order diffracted lights.

10. An encoder according to claim 8, wherein said plurality of light beams are applied to one and the same location on the diffraction grating.

11. An encoder according to claim 10, further having a reflecting mirror for reflecting and directing said plurality of light beams to one and the same location on the diffraction grating.

12. An encoder having:

light applying means having an optical divider for dividing a light beam into a plurality of light beams and applying the divided respective light beams to a diffracting grating from a predetermined direction which is not contained in a reference plane defined by the direction of relative movement of the diffracting grating and by a direction normal to the diffracting grating;

re-entering means having reflecting means, said reflecting means being located so as to reflect diffracted light beams of predetermined order except for the 0-th order, generated by the application of the respective light beams by said light applying means to the diffracting grating, and for causing the reflected light beams to re-enter the diffracting grating at substantially th same position as the position at which the diffracted light is generated;

interfering means for combining and interfering, with said optical divider, diffracted, reflected, and re-diffracted light beams diffracted by the diffracting grating, reflected by said reflecting means to re-enter the diffracting grating and re-diffracted by the diffracting grating with each other; and detecting means for detecting light having a light detector located at a position capable of receiving the interfered light created by said interfering means and not receiving the 0-th order light, whereby information of the relative movement of the light beam and the diffracting grating can be obtained on the basis of an output of said detecting means.

13. An encoder according to claim 12, wherein said re-entering means is disposed so that the direction of said reflected light may be substantially symmetrical with said predetermined direction with respect to said reference plane, and causes the reflected light to re-enter substantially the same position as the position at which said diffracted light is generated.

14. An encoder according to claim 13, wherein said re-entering means forms a cat's-eye optical system in which the direction of incidence onto said re-entering means and the direction of reflection from said re-entering means are substantially identical to each other.

15. An encoder according to claim 12, wherein said light applying means includes the light source for producing the light beam.

16. An encoder according to claim 15, wherein said light source is a semiconductor laser.

17. An encoder according to claim 12, wherein said detecting means includes a plurality of photodetector elements, and said encoder detects the information of the direction of movement of the diffraction grating as well as the information of the amount of displacement of the diffraction grating.

18. An encoder according to claim 12, wherein said encoder is a rotary encoder and wherein the diffraction grating is formed along the direction of rotation of a rotational object, and said detecting means obtains the information of the amount of rotation of the diffraction grating.

19. An encoder according to claim 12, wherein a plurality of light beams obtained by said light divider are applied onto the diffraction grating, and an interference light formed by a plurality of diffracted lights of different orders emerging from the diffraction grating is detected by said detecting means.

20. An encoder according to claim 19, wherein said plurality of diffracted lights of different orders are ±1st-order diffracted lights.

21. An encoder according to claim 19, wherein said plurality of light beams are applied to one and the same location on the diffraction grating.

22. An encoder according to claim 21, further having a reflecting mirror for reflecting and directing said plurality of light beams to one and the same location on the diffraction grating.

23. A driving system including an encoder, said driving system having:
   driving means;
   an encoder for detecting the driving state of said driving means; and
   control means for controlling the driving of said driving means on the basis of the output of said encoder;
   said encoder comprising:
      a diffracting grating formed on a movable portion of said driving system connected to a driving output portion of said driving means;
      light applying means for applying a light beam from a light source to said diffracting grating from a predetermined direction which is not contained in a reference plane defined by the direction of relative movement of said diffracting grating and by a direction normal to said diffracting grating;
      re-entering means having reflecting means, said reflecting means being located so as to reflect a diffracted light of predetermined order except for the 0-th order generated by said application of the light beam by said light applying means to said diffracting grating, and for causing the reflected light to re-enter said diffracting grating at substantially the same position as the position at which the diffracted light is generated;
      interfering means for combining and interfering diffracted, reflected, and re-diffracted light diffracted by said diffracting grating, reflected by said reflecting means to re-enter said diffracting grating and re-diffracted by said diffracting grating, with another light beam from the light source; and
      detecting means for detecting light, having a light detector located at a position capable of receiving the interfered light created by said interfering means and not receiving the 0-th order light, whereby information of the relative movement of the light beam and said diffracting grating being obtained on the basis of an output of said detecting means.

24. A driving system according to claim 23, wherein said re-entering means is disposed so that the direction of said reflected light may be substantially symmetrical with said predetermined direction with respect to said reference plane, and causes said reflected light to re-enter substantially the same position as the position at which said diffracted light is created.

25. A driving system including an encoder, said driving system comprising:
   driving means;
   an encoder for detecting th driving state of said driving means; and
   control means for controlling the driving of said driving means on the basis of the output of said encoder;
   said encoder comprising:
      a diffracting grating formed on a movable portion of said system connected to a driving output portion of said driving means;
      light applying means having a light divider for dividing a light beam into a plurality of light beams and applying the divided respective light beams to said diffracting grating from a predetermined direction which is not contained in a reference plane defined by the direction of relative movement of the said diffracting grating and by a direction normal to said diffracting grating;
      re-entering means having a reflecting means, said reflecting means being located so as to reflect diffracted light beams of predetermined order except for the 0-th order generated by the application of the light beams by said light applying means to said diffracting grating, and for causing the reflected light to re-enter said diffracting grating at substantially the same position as the position at which the diffracted light is generated;
      interfering means for combining and interfering, with said optical divider, diffracted, reflected, and re-diffracted light beams diffracted by said diffracting grating, reflected by said reflecting means to re-enter said diffracting grating and re-diffracted by said diffracting grating with each other; and
      detecting means for detecting light and having a light detector located at a position capable of receiving the interfered light created by said interfering means and not receiving the 0-th order light, whereby information of the relative movement of the light beam and said diffracting grating can be obtained on the basis of an output of said detecting means.

26. A driving system according to claim 25, wherein said re-entering means is disposed so that the direction of said reflected light may be substantially symmetrical with said predetermined direction with respect to said reference plane, and causes the reflected light to re-enter substantially th same position as the position at which said diffracted light is created.

* * * * *